United States Patent [19]

Fleisher et al.

[11] 3,912,391

[45] Oct. 14, 1975

[54] OPTICAL INFORMATION STORAGE AND RETRIEVAL SYSTEM WITH OPTICAL STORAGE MEDIUM

[75] Inventors: Harold Fleisher; Harris, Thomas J.; Eugene Shapiro, all of Poughkeepsie, N.Y.

[73] Assignee: International Business Machines Corporation, Armonk, N.Y.

[22] Filed: Dec. 23, 1963

[21] Appl. No.: 332,755

[52] U.S. Cl. ............. 355/54; 96/27 R; 340/173 LT; 340/174.1 M; 350/47; 350/163; 355/77

[51] Int. Cl. ......................... G03b 27/44; G11b 5/00

[58] Field of Search... 340/173 L, 174.1 MO, 146.3; 88/1, 61 J, 65; 96/2, 27; 350/147, 150–159, 160–166; 355/18, 40, 43, 46, 54, 77

[56] References Cited

UNITED STATES PATENTS 3,107,170 10/1963 Netke ....................................... 96/2

OTHER PUBLICATIONS

Van Heerden, P. J., "Theory of Optical Information Storage in Solids," *Applied Optics*, Vol. 2, No. 4, pp. 393–400, Apr. 1963.

Spencer, D. A., "The First Hundred Years of Color Photography", The Photographic Journal, pp. 265–272, Sept. 1961.

*Primary Examiner*—Richard A. Wintercorn
*Attorney, Agent, or Firm*—Robert Lieber

[57] ABSTRACT

Storage of information is performed by interference effects in depth in an optically accessible information storage unit. The storage unit is divisible into a plurality of individual information storage areas permitting the recording of the information in the form of various light and no light conditions. Plural light scattering layers are formed in depth in the unit corresponding to the information stored in that area. Read out is performed by applying light to the unit. The scattering layers act on the applied light in accordance with the information stored to provide indications for detection of the stored information.

47 Claims, 14 Drawing Figures

OPTICAL INFORMATION STORAGE AND RETRIEVAL SYSTEM WITH OPTICAL STORAGE MEDIUM

The present invention is related to information storage systems and more particularly to a read-only memory system for storing large quantities of permanent or semi-permanent information.

Read-only memories have been used in data-processing equipment where large quantities of information must be stored. Certain of the prior art read-only memories utilize optical techniques. One such memory utilizes punched holes in an opaque card. To read out a digit, a beam of light is directed to the appropriate spot on the card. If the hole has been punched in this spot in the card, the light passes through and actuates a photoelectric cell. Another type of proposed memory utilizes photographic media wherein the information can be stored at a much higher density. In its most effective embodiment to date, the beam of light is directed to the appropriate spot by means of a flying-spot scanner. A second proposed method of illuminating the spot in the photographic memory is to use an electroluminescent matrix.

The use of photographic media as information storage unit has been recognized as theoretically attractive for some time. The principal reason for its attractiveness is the high density of information storage that available photographic emulsions can yield. An important limitation, however, to the density of storage on a photographic surface by conventional means is due to diffraction effects. For example, digital information recorded as alternate light and dark regions at a linear density at $1.73 \times 10^3$ bits per inch, if scanned by a beam of white light of cross-section comparable to the width of the transparent region (approximately $1.5 \times 10^{-3}$ centimeters) will produce an image of a transparent region at a screen 1 centimeter away in the order of $3.7 \times 10^{-2}$ centimeters. Doubling the density of recording will double the size of the image and will considerably increase the "spill over" of light from the transparent region into the opaque region.

It has been suggested that a relatively small increase in the density of information storage and photographic media can be achieved by the use of color photography rather than black-and-white. Three bits of information can be stored in the place of one bit by using three dyes in the photographic emulsion. Each reading station would then involve color filters or dichroic mirrors to separate the three bits stored at each spot. The number of colors which may be used is limited to three or four because of the wide absorption spectrum of the available dyes.

Photography in colors by means of standing waves is known to the photographic art although it has been little used. The resulting color photograph and the process for making the color photograph are generally known as the Lippmann photograph and process because of Gabriel Lippmann's early work in the field. The Lippmann color photograph consists essentially of a fairly transparent layer of gelatin which contains thin laminae of reflecting material. These laminae are produced by the action of standing waves of light of the originally photographically sensitive emulsion caused by reflection of the incident light back through the emulsion from a reflecting surface in contact with the emulsion. Viewed by reflection, the developed film exhibits color.

An object of the present invention is to provide an optically accessible memory system capable of storing information at high density.

Another object of the present invention is to provide an optically accessible storage unit which contains information in three dimensions.

Another object of the present invention is to provide an optically accessible storage unit which has information stored in depth in the form of light scattering layers spaced at periodic intervals.

Another object of the present invention is to provide an optically accessible storage unit having information stored in depth within a medium by use of standing light wave techniques.

Another object of the present invention is to provide a system for recording information into a three-dimensional optically accessible storage unit simultaneously in two dimensions.

Another object of the present invention is to provide a system for recording information into a three-dimensional optically accessible storage unit wherein the information storage mask for each storage location of the storage unit is changeable by high speed electrical techniques thereby substantially reducing the overall information recording time requirement.

Another object of the present invention is to provide a system for reading large quantities of information at high speeds from the optically accessible storage unit without cross-talk or interference.

It is a further object of the present invention to provide a system for reading information from an optically accessible storage unit wherein all components of the read-out system remain stationary throughout the reading operation.

It is a still further object of the present invention to provide a system for reading information from one of a plurality of optically accessible storage units using high speed electro-optic switching techniques.

In accordance with the broad aspects of the present invention, there is provided an optically accessible memory system which utilizes the beams of coherent, collimated, uniquely polarized, monochromatic light such as those produced by lasers for the recording of information into an optically accessible storage unit. The recorded information in the optically accessible storage unit is read out by directing a light beam containing all recorded frequencies onto the storage unit and detecting the reflected coherent frequencies. The prime purpose of the memory system is to achieve a high-density read-only memory system which has very short access times. Interference effects are used to create standing light waves in a light sensitive medium to record information therein at high density. The medium is then processed to form the optically accessible memory unit. This type of recording allows either the simultaneous, parallel read-out or serial read-out of the recorded information. An important feature of the invention is the utilization of the depth dimension of the medium in an efficient manner to pack additional information in the optically accessible storage unit without aggravating the diffraction effects of close packing on the surface.

The optically accessible storage unit is composed principally in its unexposed condition of a thick photosensitive medium. The storage unit is divisible into a plurality of individual information storage areas. Various anharmonic light frequencies containing information in the form of a light or no-light condition are applied to each information storage area in the storage unit. A reflecting surface is positioned immediately behind the unexposed storage unit. A standing wave is set up in the photosensitive medium for each monochromatic light frequency by reflecting a normally incident beam back upon itself in each of the storage areas to which the beam is applied. The photosensitive medium is modified at the antinodes of the standing light waves so that, after processing and fixing, a plurality of light scattering layers are formed in depth in the medium spaced at periodic intervals for each anharmonic frequency of information stored therein.

The read-out of information is accomplished by applying light containing a mixture of the recorded anharmonic frequencies at normal incidence to the optically accessible storage unit. The incident light shining on the scattering layers produces coherent reflective scattering from the layers in the unit for their particular frequencies. Frequencies of light which have not been recorded in a given information storage area will not be coherently reflected. This light is reflected incoherently from each of the many partially reflecting layers, resulting in a considerably reduced intensity relative to the coherent reflected light of a recorded anharmonic frequency in the given storage area. The reflected light is detected for the presence of information in each component frequency at each storage location. The presence of the information in a given storage unit is converted to an electrical signal and thereafter used as desired.

A scattering layer is defined for purposes of the present invention as a light reflective region within a substantially transparent body. The resulting periodically spaced scattering layers for each light frequency applied to the photosensitive medium have the characteristic of causing a coherent scattering or reflection of incident light of the recorded frequencies corresponding to the periodic scattering layers. The scattering layers, therefore, act as a passive source of reradiation of the incident light.

There are several classes of photosensitive materials which form the above described periodically spaced scattering layers upon application of standing light waves of given monochromatic frequencies. Color sensitive dyes of, for example, the diazo type can be incorporated into an emulsion, exposed and read out, according to the present invention. Alkali halides with color centers in an emulsion can be bleached by the action of standing light waves and the recorded information retrieved therefrom. However, the most preferred photosensitive medium is a thick silver halide type of photographic emulsion. Much larger amounts of information can be recorded in the depth dimension and readily recovered using the silver halide type emulsion than any other of the photosensitive mediums presently known.

The foregoing and other objects, features and advantages of the present invention will be apparent from the following more particular description of the preferred embodiments of the invention as illustrated in the accompanying drawings:

IN THE DRAWINGS

Figure 5:
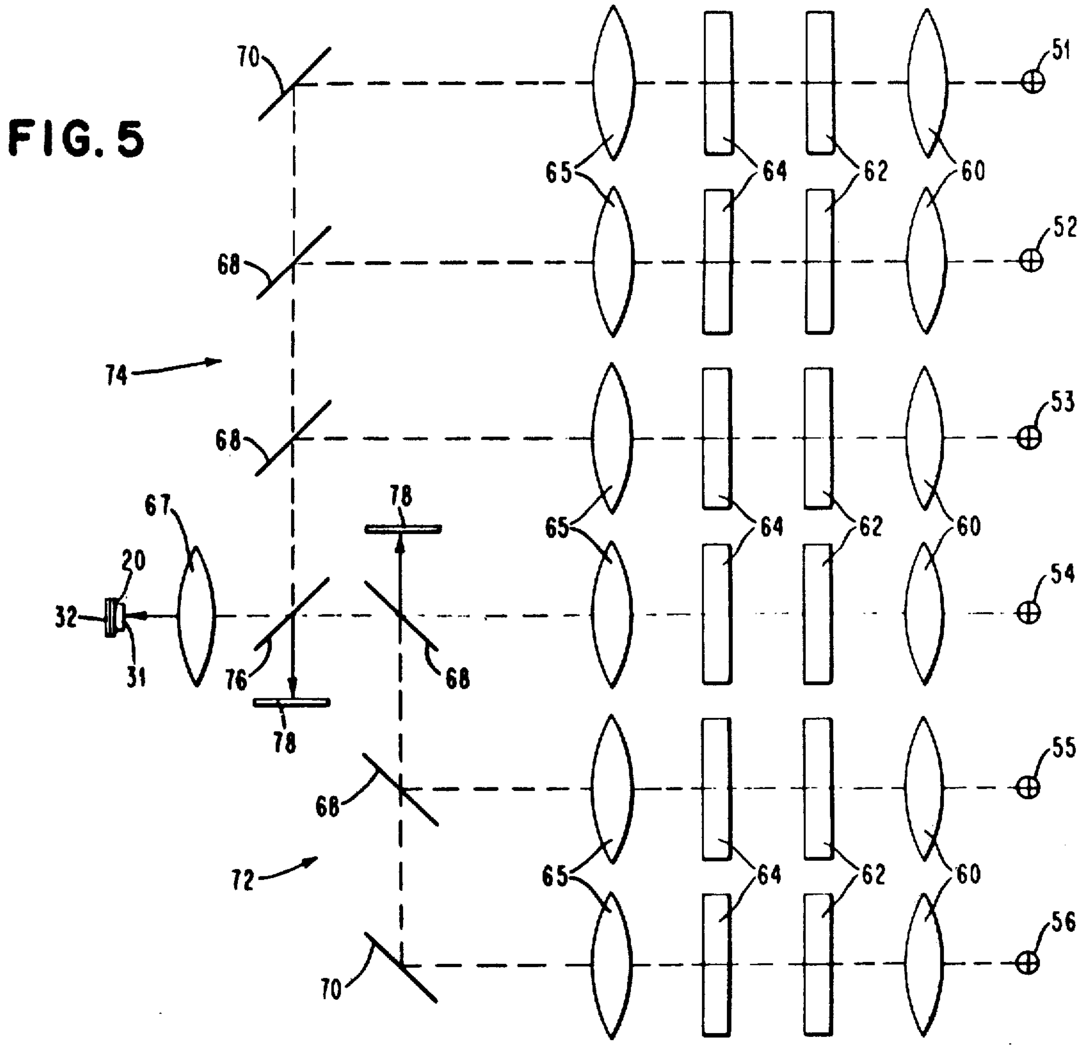
Figure 6:
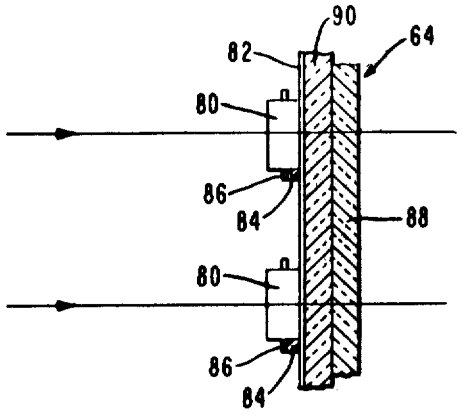
Figure 7:
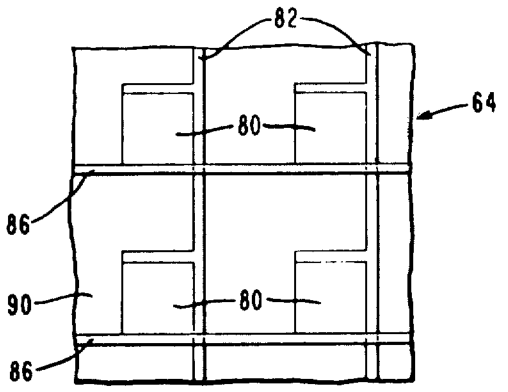
Figures 8, 12:
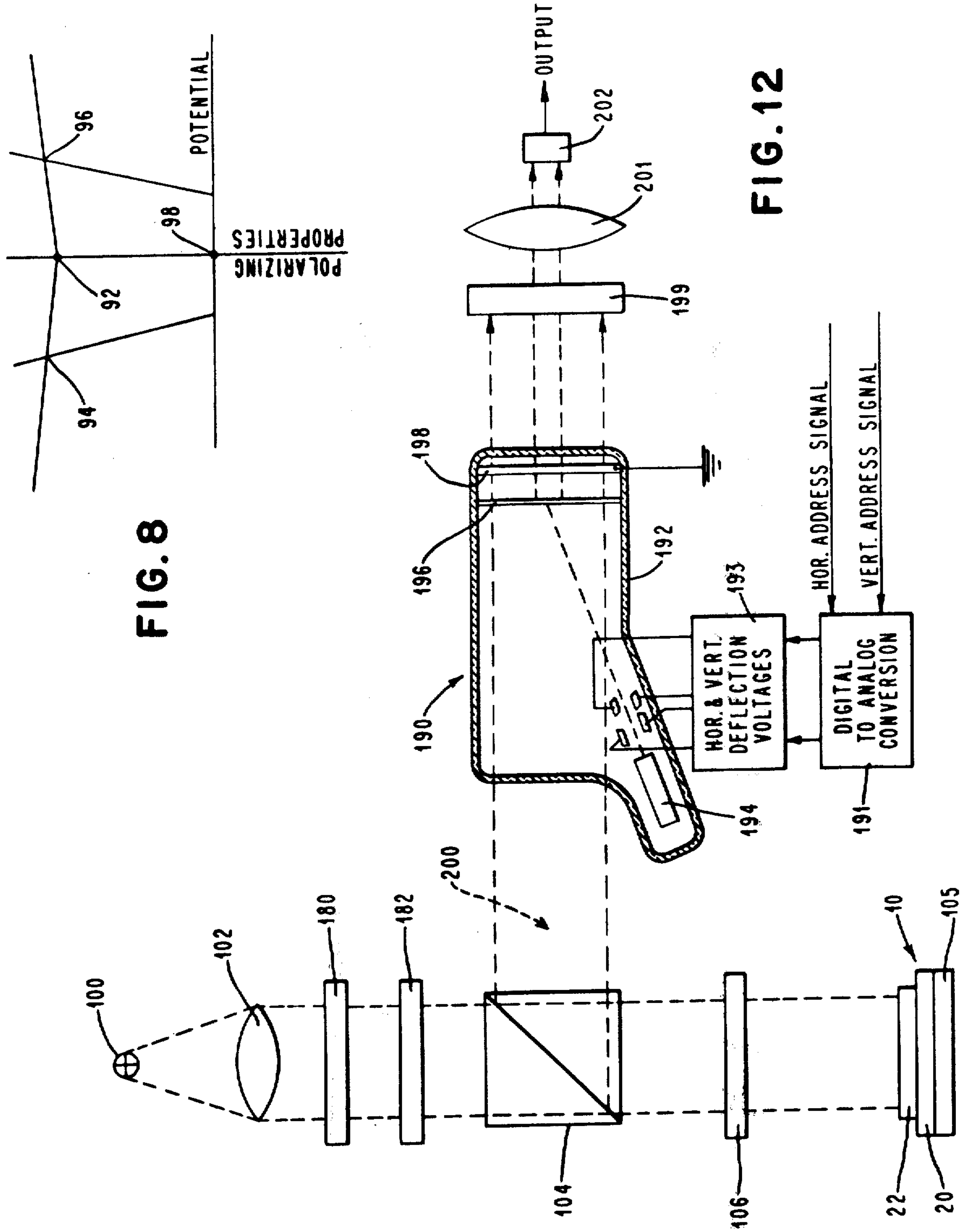
Figures 9, 10:
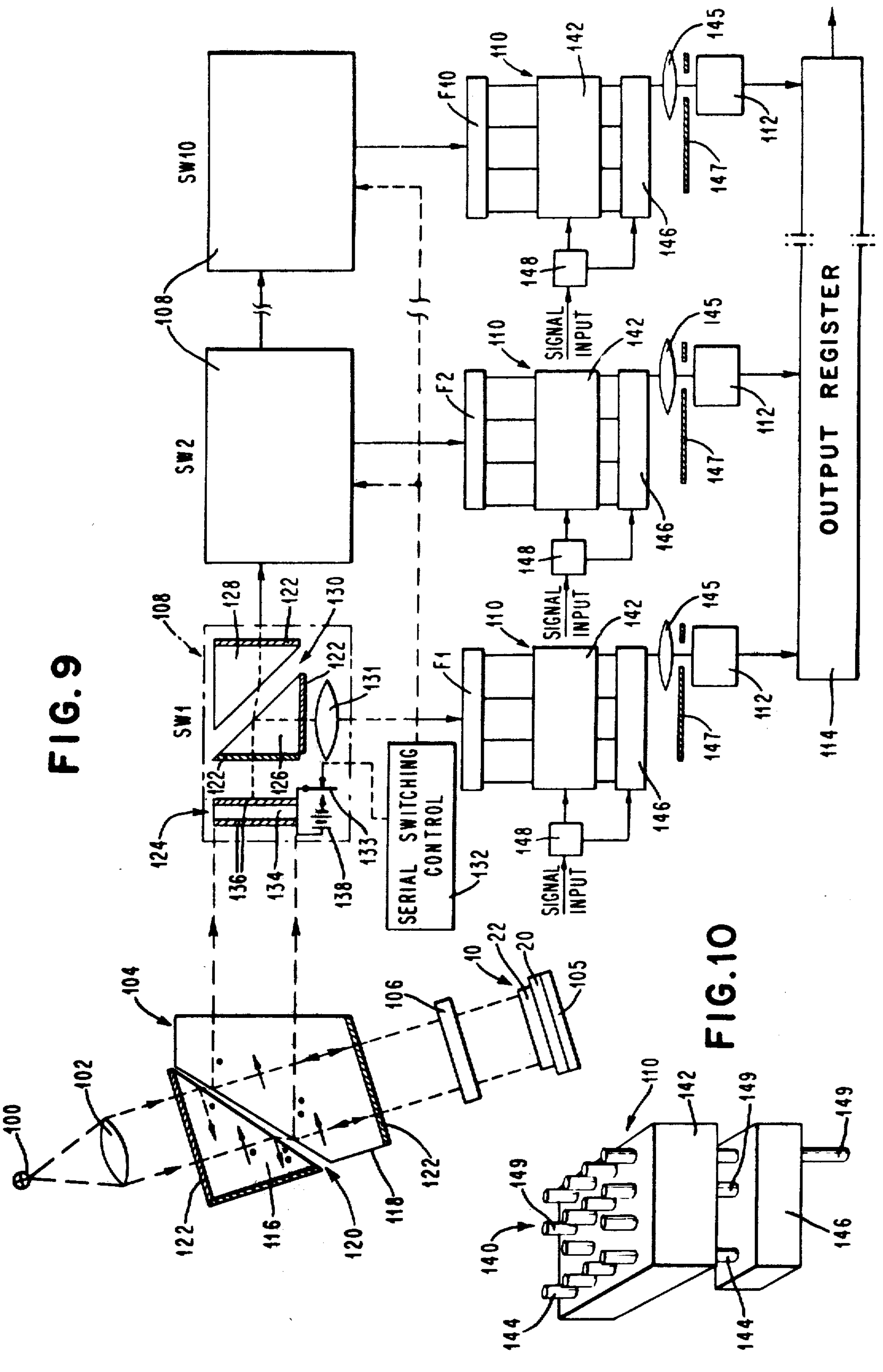
Figure 11:
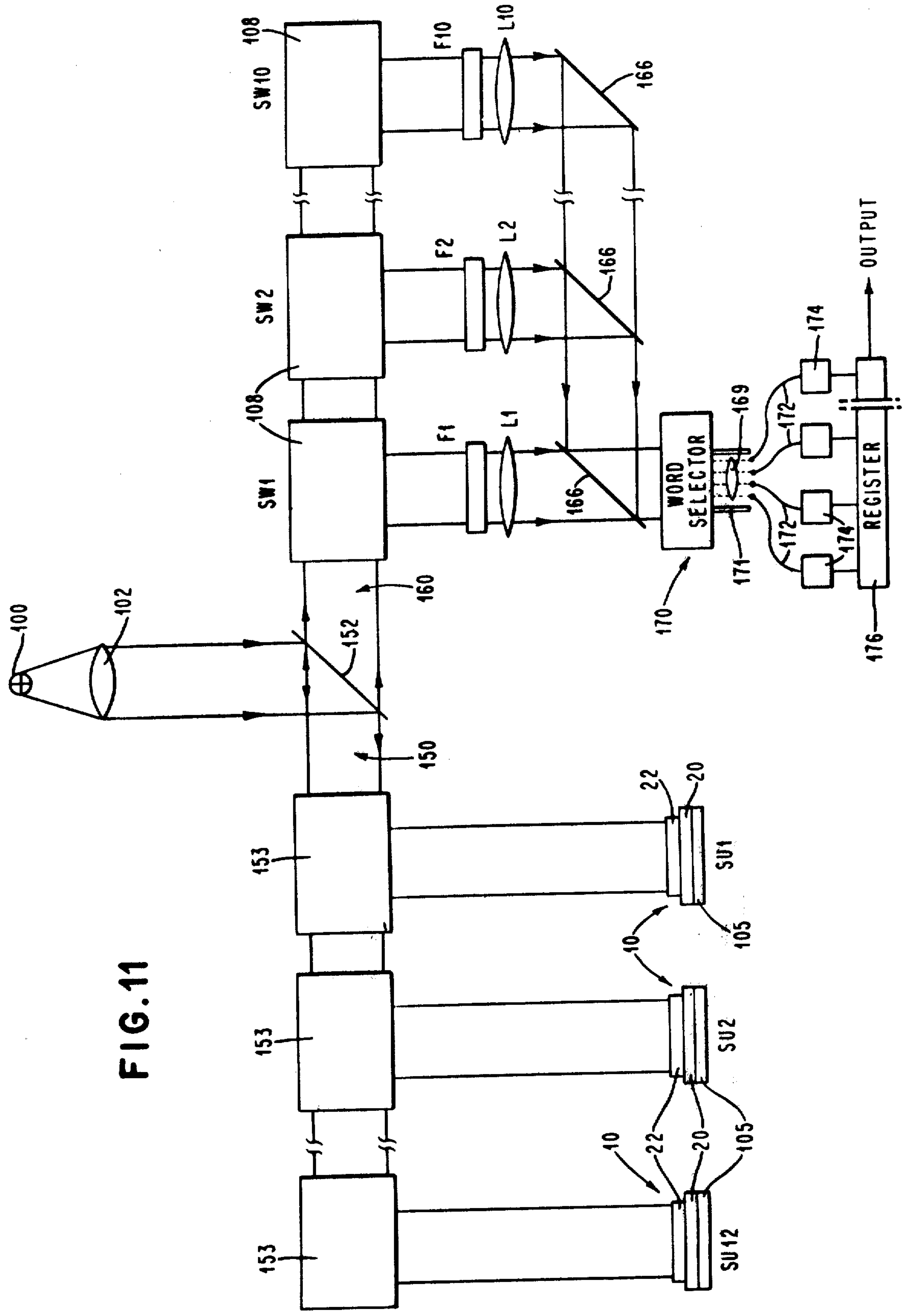
Figure 13:
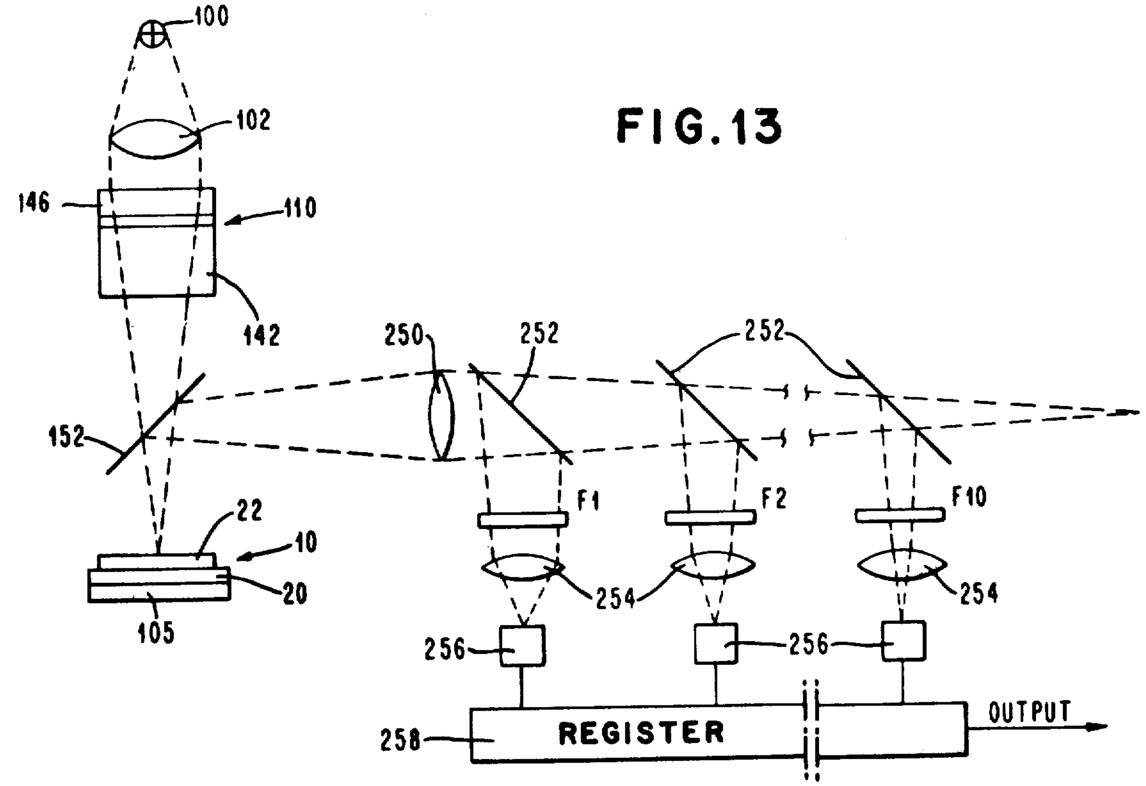
Figure 14:
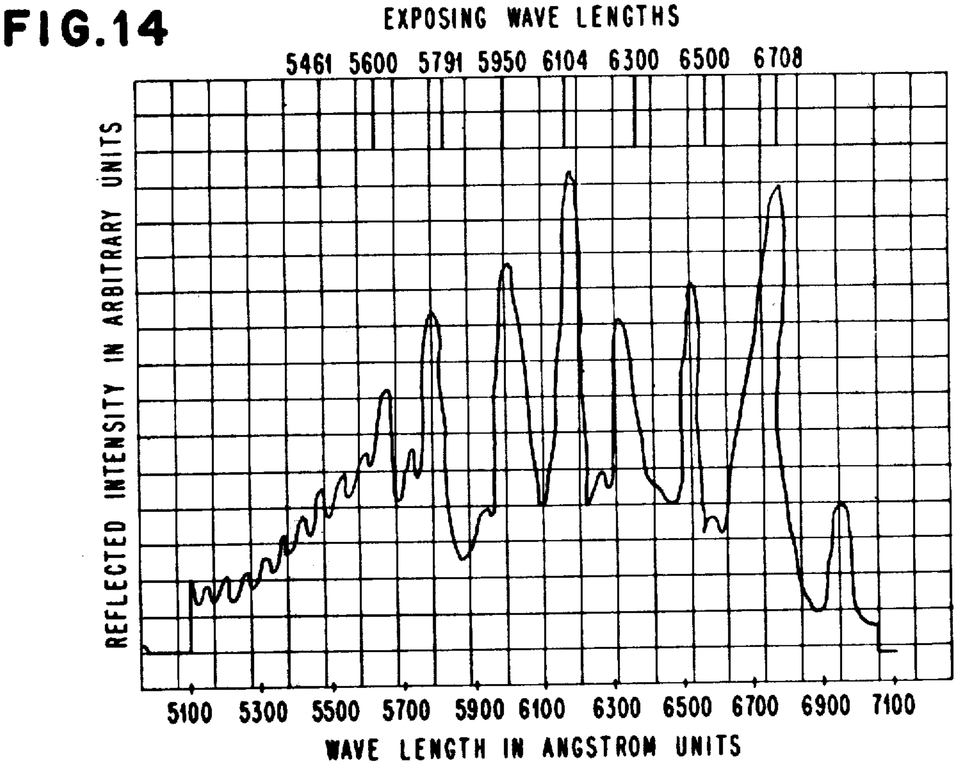

FIG. 5 schematically illustrates a system for recording information into an optically accessible storage unit;

FIG. 6 is a sectional side view of the preferred information mask utilized with the FIG. 5 embodiment for the recording of information into a storage unit;

FIG. 7 is a front view of the FIG. 6 information mask;

FIG. 8 is a diagram to illustrate the remanent electrooptic characteristic of material used in the FIGS. 6 and 7 information mask;

FIG. 9 is a first embodiment for reading information from an optically accessible storage unit;

FIG. 10 is a schematic illustration of the means for selecting the particular information storage areas to be read in the FIG. 9 embodiment;

FIG. 11 is an illustration of a second embodiment for reading information from an optically accessible storage unit wherein means are additionally provided for selectively addressing one of a plurality of storage units;

FIG. 12 is an illustration of a third embodiment for reading information from an optically accessible storage unit;

FIG. 13 is an illustration of a fourth embodiment for reading information from an optically accessible storage unit; and FIG. 14 is a graph showing an actual recorded read-out of eight anharmonic, coherent light frequencies from an optically accessible storage unit.

Figures 1, 3:
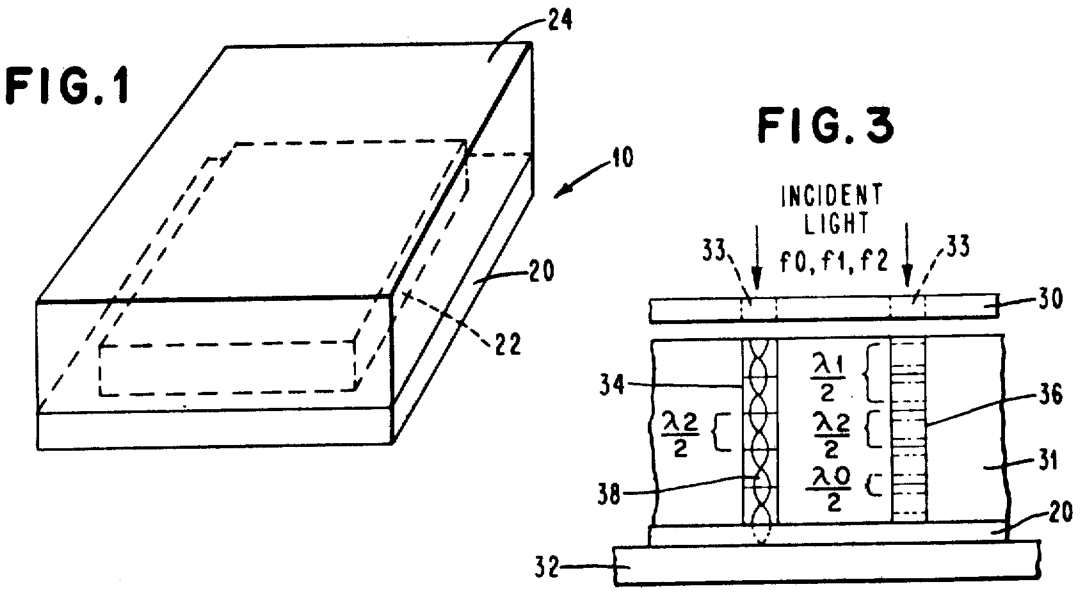
FIG. 1 is a perspective illustration of the optically accessible information storage unit of the present invention.
FIG. 3 is a greatly enlarged, sectional illustration of a portion of the optically accessible storage unit during the recording of information therein.
Figure 2:
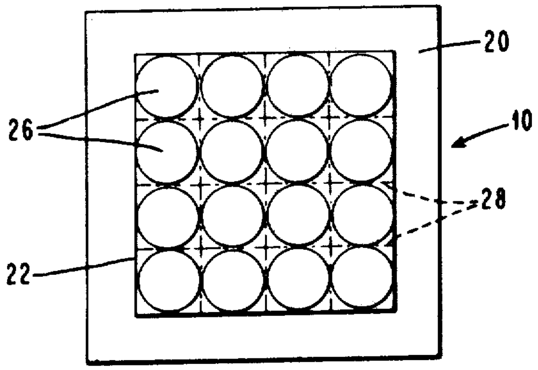
FIG. 2 is a schematic illustration of the top view of an optically accessible storage unit.

Referring now, more particularly, to FIGS. 1 and 2, there is shown an optically accessible information storage unit 10. The storage unit includes a transparent support plate 20 and a transparent film 22 on the plate 20. The film 22 is protected by the encapsulating layer 24. The layer 24 has a refractive index substantially the same as the film 22. A reflecting layer 32 can optionally form a part of the storage unit. The layer 32, which is used in the preferred method for recording information into the storage unit, would be located on the side of support 20 opposite the film 22. The film 22 is divisible into a plurality of individual information storage areas 26, such as by a grid-like portion 28 of the film which contains no information and is of such size as to disallow light interference or cross-talk between the information storage areas or locations during recording or read-out of information.

FIG. 3 shows in a greatly enlarged and schematic way the recording process and the optically accessible storage unit product obtained therefrom. An information containing mask 30 is placed over the unexposed photosensitive media 31 and a reflecting surface 32 is located on the side opposite the film from the mask 30. Incident light comprising anharmonic, coherent monochromatic frequencies $f_0$, $f_1$ and $f_2$ are applied through the information openings 33 in mask 30 to the photosensitive medium 31. In the case of information storage area 34, only frequency $f_2$ was allowed to pass the mask 30, while in the case of information storage area 36 all three frequencies $f_0$, $f_1$ and $f_2$ were allowed to pass the mask 30. In all cases, the incident light passes through the medium 31 and is reflected back upon itself to establish standing waves within the medium 31. At the antinodes of the standing wave 38, schematically shown in information storage area 34, there is a substantial reduction of the photosensitive medium with essentially no exposure at the nodes of the standing wave. For light applied normal to the surface of the media 31 the spacing of the reduced areas of the film is one-half of the wave length of the frequency applied as measured in the medium, which has index of refraction, M.

In the information storage area 36 all three frequencies $f_0$, $f_1$ and $f_2$ have been applied through the information opening 33. An individual standing wave was established for each frequency due to the reflecting surface 32 and the reduction of the photosensitive medium 31 was accomplished at one-half wave length intervals for each frequency. The mask 30 and the reflective surface 32 are removed and the medium is developed and fixed. A plurality of light reflective scattering layers in depth for each frequency of information stored within the individual information storage areas 34 and 36 is then present in the optically accessible storage unit. The resulting reflecting layers are shown in FIG. 3 as solid lines for frequency $f_2$, dashed lines for frequency $f_1$ and dot-dash lines for frequency $f_0$.

The information storage area 36 is illustrated as having applied to it three standing waves as indicated by the three frequencies. If the number of resulting reflecting planes or layers for frequency $f_1$ is $n_1$, for $f_0$ is $n_0$, and for $f_2$ is $n_2$, the signal-to-noise ratio of the reflected light at frequency $f_0$ is proportional to $n_0/2$; the signal-to-noise ratio of the reflected light at frequency $f_1$ is proportional to $n_1/2$; and the signal-to-noise ratio of the reflected light at frequency $f_2$ is proportional to $n_2/2$.

Figure 4:
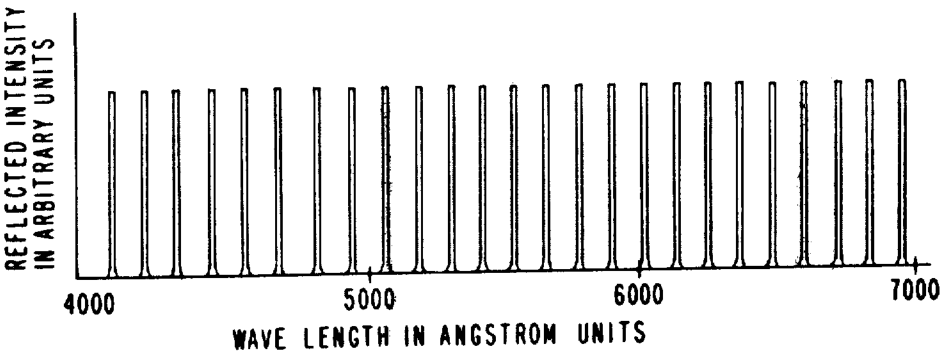
FIG. 4 is a graph showing optimum read-out of 25 anharmonic, coherent light frequencies from an optically accessible information storage unit.

The ability of the photosensitive media 31 to store many frequencies in depth such as the 25 anharmonic frequencies indicated in the graph of FIG. 4, or even up to 100 or more frequencies, is determined by the thickness of the photosensitive media and the statistical coherency of the light radiation used to record the information in the medium. The coherence length of light is related to the bandwidth of radiation by the following equation:

$$(1) \qquad \Delta l' \approx \lambda^2/\Delta\lambda$$

To apply this equation to the standing waves produced by reflection in the photosensitive media, the index refraction of the media, n, and the reflection from the reflective surface 32 which produces a node at that surface must be considered. The effective coherence length in the photosensitive medium is:

$$(2) \qquad \Delta l'_e \approx \frac{\lambda^2}{2n\,\Delta\lambda} \approx \left(\frac{\lambda}{\Delta\lambda}\right) \cdot \left(\frac{\lambda}{2n}\right)$$

where $\lambda/2n$ is the half wave length of the light in the photosensitive media and $k = \lambda/\Delta\lambda$ the number of waves in the coherence interval. The coherence interval, measured in $k$ numbers of waves, is independent of the material through which the light is passing and is determined only by the source of the radiation. The $k$ is therefore the measure of the bandwidth of the light source. A filter has the property of modifying the light source. The filter in combination with the source may be treated as a new source with a new bandwidth. This is relevant to the frequency selectivity on read-out.

The k then may be explicitly stated as the number of waves in the coherence interval:

$$(3) \qquad k \approx \frac{\Delta l e}{\left(\frac{\lambda}{2n}\right)}$$

The mechanism of producing the standing wave pattern requires reflection of the normally incident light onto itself from a reflective surface, producing a node at the reflecting surface, an antinode $\lambda e/4$ away, and additional antinodes $$\frac{\lambda e}{2} = \frac{\lambda}{2n}$$

apart. Since $\Delta l_e$ denotes the space measured from the reflective surface in which the standing wave pattern is created, it is clear that the above equation for $k$ also gives the number of antinodes that will be created in the photosensitive media 31 with recording radiation characterized by $k = \lambda/\Delta\lambda$. The photosensitive media is sensitized at the antinodes of each standing wave pattern and reduced to its modified form by subsequent developing and fixing operations to produce the optically accessible memory film 22. Thus, the number of reflecting layers is also determined by the equation for $k$.

The above equations supply us with the criteria to insure that there is compatibility between the light used to record into the photosensitive medium 31 and the thickness of the photosensitive medium required. Clearly, if the photosensitive medium is thicker than $\Delta l_e$, the medium is not being used to its fullest capability, since the standing wave is shorter than the medium. As an example, consider that the photosensitive medium is 15 microns thick. If we assume that the wave length, λ, is 5000 Angstrom units, and the wave length's bandpass is 100 Angstrom units, we have $k$ = 5000/100 = 50. Thus, the standing wave in the photosensitive medium has approximately 50 antinodes. If the index of refraction of the photographic media, $n$, is 3/2, then $\Delta l'_e \approx 8.3$ microns or $8.3 \times 10^4$ Angstrom units. To make full use of the photosensitive medium thickness of 15 microns, a proper bandwidth of the writing radiation must be selected, having the $\Delta l'_e$ equal to or thicker than the medium so that the medium will be completely filled with scattering layers. Using the equation (3) above and considering the light wave length to be 5000 Angstrom units, $k = \lambda/\Delta\lambda \approx 90$. The bandpass of the light, Δλ, is therefore 5000/90 = 56 Angstrom units. If a more monochromatic light source is used, that is, of narrower bandpass, the coherence interval is wasted because such a light source would be capable of producing a usable standing wave pattern in a thicker photosensitive media.

For a photosensitive media of 1000 microns in thickness exposed to a monochromatic radiation of 6000 Angstrom units wave length with a bandpass of 1.2 Angstrom units, a standing wave pattern is produced that will utilize the entire depth dimension of the photosensitive medium. Approximately 5000 reflecting layers are created in this photosensitive medium.

If two anharmonic frequencies of comparable bandpass are recorded in the film 22 of the optically accessible storage unit at the same information storage area 26, each frequency may be read out simultaneously and independently with comparable intensity and with a signal-to-noise ratio of about 2500 to 1. At the cost of some reduction of the signal-to-noise ratio, 25 different anharmonic frequencies of comparable bandwidth such as shown in FIG. 4 may be stored in the identical information storage location 26 in the photographic medium. The result is a 25 fold increase in packing density over the usual two-dimensional recording of information. A megabit optically accessible storage unit can readily be envisioned having the following characteristics:

| | |
|---|---|
| Storage location spot size | 30 microns |
| Storage locations | $1 \times 10^6$ spots/square inch |
| Storage unit area | 1 square inch |
| Number of storage locations in the storage unit | $1 \times 10^6$ |
| Number of bits of information in a storage location | 25 |
| Number of bits of information in the storage unit | $2.5 \times 10^7$ |
| Random access time | 100 nanoseconds |

FIGS. 5, 6 and 7 illustrate the preferred embodiment of the system for recording information into a photosensitive medium 31 to provide a three-dimensional optically accessible storage unit 10. The system illustrated in FIG. 5 allows the simultaneous recording of six anharmonic, coherent, monochromatic light frequencies into the photosensitive media. The number of simultaneously recorded light frequencies can obviously be increased or decreased according to the general principles of the system.

A high intensity, collimated, substantially monochromatic light beam for each monochromatic frequency to be recorded is provided by means of high intensity, substantially monochromatic light sources 51, 52, 53, 54, 55 and 56 in combination with light collimating lens 60 associated with each of the respective light sources. The light sources are conveniently continuous wave or pulsed laser sources. Other possible monochromatic light sources include carbon and mercury arc lamps with appropriate filters. A light polarizing means 62 is positioned in the collimated light path of each monochromatic frequency for polarizing the collimated light of that frequency. Information mask 64 containing information to be recorded in the established information areas in the form of open and closed light paths for each associated light frequency is the next element in the plurality of light paths. The reducing lens 67 positioned immediately in front of the medium 31 reduces the information pattern for each frequency to be recorded in the photosensitive medium 31. The lens 65 corrects for the optical path length between the mask 64 and film 31. A series of means associated with each monochromatic light path which preferably includes beam splitters 68 and mirrors 70 is used for superimposing or mixing the information patterns to be recorded in the photosensitive medium 31. The beam splitters can be halfsilvered mirrors. To avoid undue loss of light, the superimposing of half of the monochromatic frequencies in the light paths 72 and 74 is used in preference to a single series of beam splitters for superimposing the various monochromatic frequencies. The superimposed frequencies from light paths 72 and 74 are then combined using the beam splitter 76 and the combined frequencies are passed to the photosensitive medium 31. Light absorbers 78 absorb excess light in the system. All frequencies of the combined light pattern are reflected off the reflecting surface 32 and the standing wave patterns, described above, effected. The photosensitive medium 31 is modified at the antinodes of each standing wave pattern developed. The photosensitive medium 31 on its substrate 20 is taken from the recording system, developed and fixed to take its place as a permanent, optically accessible storage unit 10.

The information mask 64 associated with each monochromatic light beam establishes individual information locations 26 in the collimated light beam as shown in FIG. 2. The mask also contains information in the established information areas in the form of open and closed light paths. The monochromatic, collimated light beams which leave each mask have in cross section a no-light, grid-like portion 28 which separates the information areas of light and no-light corresponding to the open and closed paths in the associated information mask.

FIGS. 6 and 7 illustrate the preferred structure of the information mask 64. An arbitrary selected portion of the mask matrix is shown in FIGS. 6 and 7. The actual mask contains a much larger number of elements than those shown.

Information mask 64 is composed of a body of electro-optically active material or medium 80 which is either a large, single transparent crystal or a mosaic having a transparent crystal for each transparent information area. An electrode system on the electro-optic medium 80 allows the application of an electric field to be applied to the medium. The effect of the electric field application is to induce birefringence in the electro-optic medium. The electrode system shown in the present embodiment utilizes coordinate selection. There is a plurality of vertical conductors 82 which are parallel to one another, equally spaced and positioned on one side of the electro-optic medium. On the other side of the electro-optic medium 80 and separated from the vertical electrodes 82 by means of an insulating material 84, is a plurality of parallel, equally-spaced horizontal electrodes 86. The horizontal and vertical selection electrodes are perpendicular to each other. This plurality of electrodes effectively divides the electro-optic medium into a regular pattern of active portions or regions.

An analyzer medium 88 oriented at 90° with respect to the polarizer 62 is mounted on the electro-optic medium opposite to the source of light. A glass backing 90 forms the base of the matrix 64 with the electrode system and electro-optic medium 80 attached to one side and the analyzer medium 88 to the other.

The electro-optic crystal used must have the property of remanence as to the electro-optic effect. This means that in response to an electrical potential of sufficient magnitude temporarily placed across it, the crystal is switched or saturated to its birefringent condition and remains in birefringent condition for a usable length of time after removal of the potential. The birefringent condition of the crystal is then such that a polarized light passing through it will have a change in its polarization. The change in the polarization must be sufficient to allow the selected region for light passage to pass light through the analyzer 88 close to 100% transmission.

FIG. 8 shows a diagram indicating the characteristic remanence of barium titanate ($BaTiO_3$) when maintained below its 120° C. Curie temperature. Barium titanate at a temperature below its Curie temperature retains a condition of internal polarization for a substantial period of time in response to an electrical potential temporarily placed across it. The abscissa of FIG. 8 represents the potential temporarily applied across the material. The ordinate is suggestive of the ability of the crystal to change the status of polarization of the light passing through it. The remanent point of barium titanate is indicated at 92. The crystals used in the mask are always driven past one of the points of saturation on the curve, shown at 94 and 96. When information is recorded into the mask 64 as a data bit, the polarizing status of the crystal is at 92.

The ability of the electro-optic substance to change status of polarization, represented by the ordinate in FIG. 8, is somewhat different in character depending upon the particular substance used. Crystals such as Rochelle salt, potassium dihydrogen phosphate ($KH_2PO_4$) and ammonium dihydrogen phosphate ($NH_4H_2PO_4$) display a linear electro-optic effect which changes the status of polarization of transmitted light to one polarity direction after being driven to saturation in one direction and to an orthogonal polarity direction after being driven to saturation in an opposite direction. Therefore, circularly polarized light incident on such crystals in a structure of this type can be caused to emerge linearly polarized in one of two mutually orthogonal directions, depending upon the state of the crystal at the time of the light transmission. In such an embodiment one of the directions of polarization would be considered the "one" state and the other direction of polarization would be considered the "zero" state. Crystals such as barium titanate, which is the preferred material, display a quadratic electro-optic effect which will effect radiation in the same manner after being driven to saturation in either of two opposite directions. FIG. 8, showing saturation points 94 and 96, is illustrative of the quadratic electro-optic effect of barium titanate. Thus, in the preferred embodiment a "one" is stored by saturating the memory crystals in either direction and a "zero" is stored by the removal of internal polarization, such as by an alternating, decreasing voltage or by other means, to cause the substance to be at point 98, the intersection of the ordinate and the abscissa, in FIG. 8.

The orientation of the crystals in the mask is not critical, but the remanent electro-optic effect can be enhanced by properly orienting a given crystal type. For example, barium titanate and Rochelle salt crystals are oriented to use the transverse electro-optic effect, where the polarizing electric field is at right angles to the direction of light propagation. A potassium dihydrogen phosphate crystal is oriented with the polarizing electric field and the direction of light propagation along the optic axis.

The information mask 64 is preferably operated within 10° to 20° C. of the Curie temperature of the crystals used. The individual crystals listed above can be switched in microseconds with approximately 200 volts at the preferred operating temperature. Also, the temperature chosen is closely controlled to reduce temperature variations to 1° C. The desired operating temperature can be achieved by immersing the mask in a fluid bath controlled automatically to the temperature.

The decay time in the remanent electro-optic crystals is in the range of 1 to 5 minutes, depending largely on the crystal used. Information could be recycled into the mask when recording of that information is required for longer periods. Decay of the remanent condition of the crystals can be speeded up by an exponentially decaying A.C. switching voltage when it is desired to erase the information in the mask prior to the insertion of new information therein.

To write information into the information mask 64, a potential is applied across an active region of the mask for a short time by means of a pre-selected horizontal lead and a pre-selected vertical lead according to well known coordinate selection techniques. The active region is saturated or switched to a retaining polarizing capacity in accordance with the remanence characteristic of the active region used as discussed above in connection with FIG. 8. Those active regions which are to retain a binary bit of information, as distinguished from a no bit, are individually pulsed and take on a polarizing capacity in accordance with that information. The information mask is thereby filled with information in the form of active regions which will change the polarization of the polarized light passing through them or active regions which do not have this polarizing capacity. Only the light passing through the active portion of the mask 64 which changes the polarization of the light beam passing through it will pass the analyzer medium 88 and will be projected upon the photosensitive media 31.

The size of the information mask is of the order of 10 inches by 10 inches with the active regions being crystals of approximately 0.01 inches square in size. This allows a storage mask of 1000 × 1000 bits of information in each of the monochromatic frequencies used. The lens 67 reduces this relatively large 10 inch square information pattern to the size of the photosensitive medium 31 which is preferably much smaller and of the order of one to four inches square.

A first embodiment of the read-only memory reading system is shown in FIG. 9. A source of light 100 containing all frequencies recorded in the optically accessible storage unit 10 is applied to the storage unit through collimating lens 102, means 104 for passing the light from the light source to the storage unit and for providing as a separate output the reflected light from the storage unit, and a quarterwave plate 106. The reflected light output of means 104 is directed through a series of switching means 108 in the reflected light path. There are ten switching means 108 indicated in the drawing, one for each component frequency contained in the storage unit 10. The number of switching means 108 always equals the total number of stored component frequencies in the storage unit whether there be ten or even a hundred stored frequencies. When a particular component frequency is selected to be read, the light passes from the particular switching means 108 to a light filter means $F_1$, $F_2$, $F_{10}$, etc. for each component frequency which is capable of passing only the reflected light from the designated component frequency. The light deflector means 110 accepts the selected light frequency from the appropriate filter and passes the reflected light from a selected information storage location 26 of the storage unit 10 to a light sensing means such as photodetector 112 for providing an electrical signal to an output register 114. The addressing of a particular storage location or group of such locations in the storage unit is selectively controlled by a control means 148. A light absorbing means 105 positioned behind the storage unit 10 absorbs the unreflected light.

The means 104 for both passing the light from the light source to the storage unit and for providing a separate output from the light reflected from the light reflective scattering layers of the storage unit 10 includes a pair of birefringent crystals 116 and 118 having an air gap 120 between them and a quarterwave plate 106. The crystals 116 and 118 are so oriented in respect to one another that the incoming unpolarized light is polarized in crystal 116, and the polarized component passes through the crystal 118 and quarterwave plate 106 to the storage unit 10. The portion of the circularly polarized light that is reflected off the storage unit's reflective layers is again plain polarized by the quarterwave plate 106, and is totally reflected at the air gap 120 and crystal boundary of crystal 118 out of the path of the incoming polarized light. The reflected light from the storage unit, after passing twice through the quarterwave plate 106, re-enters the prism 118 as plain polarized light. This plain polarized beam is vibrating at 90 degrees to the direction of the plain polarized light beam which first entered the quarterwave plate 106. The direction of the vibration of this reflected ray is parallel to the direction of vibration of the ordinary ray of the prism 118 and by the construction of this prism or crystal it is this ray which is the output of the means 104. Anti-reflective coatings 122 are applied to the various surfaces of the crystals as illustrated to reduce spurious light reflection in the system.

The light switching means 108 for directing light to read-out means 110 is preferably constructed of an electro-optic phase plate 124, two 45 degree birefringent prisms 126 and 128 having an air gap 130 between the prisms, and a lens 131 for imaging the storage unit plane through the light filter means. The electro-optic phase plate includes an electro-optic crystal 134 sandwiched between a pair of transparent electrodes 136. The application of an appropriate potential from source 138 across the electro-optic crystal 134 by means of the electrodes 136 causes a 90 degree rotation of the direction of polarization of light passing through the electro-optic crystal. This 90 degree rotation of the polarized light causes total internal reflection of this light at the air gap 130. The reflected light is thereby switched from its normal path, which is through the series of switching means 108, through one of the component frequency light paths. When an electro-optic phase plate is not actuated, the incoming light passes directly through the switching means 108 with negligible light loss along its normal path. Anti-reflective coatings 122 are applied to the various surfaces of prisms as illustrated.

The reflective light passes through the series of switching means 108 until it reaches the chosen switching means associated with the frequency to be read out wherein the light is switched from the light path through the series of separating means 108 to the appropriate light filter and light deflecting and selecting means 110. For example, if frequency $f_{10}$ is desired to be read, the electro-optic phase plate 124 will be actuated in the switching means number SW 10 only. The reflected light containing all frequencies passes through the series separating means 108 until it comes to the separating means 108 of the switching means number SW 10 where the light path is switched through filter $f_{10}$ wherein all frequencies except $f_{10}$ are filtered out. The serial switching control means 132 may be used to provide voltages to close the switch contact 133 in the switching means 108 according to a predetermined order. The switching control means 132 is constructed according to any conventional design in the art.

The phase plate 124 for rotating the polarization plane of the incoming polarized light is preferably composed of electro-optic crystal 134 provided with transparent electrodes 136 as illustrated in the drawings. Representative of the class of electro-optic crystals usable as the crystal 134 are potassium dihydrogen phosphate ($KH_2PO_4$), potassium dideuterium phosphate ($KD_2PO_4$), ammonium dihydrogen phosphate ($NH_4H_2PO_4$), ammonium dideuterium phosphate ($NH_4D_2PO_4$) and cuprous chloride (CuCl). A voltage of approximately 7700 volts is required, for example, to cause the required polarization rotation using potassium dihydrogen phosphate as the electro-optic crystal. While an electro-optic type of phase plate is preferred, it will be obvious to those skilled in the art that other useful devices for accomplishing the polarization plane rotation may be substituted, such as Kerr cells, magneto-optical means and strain or stress-optical structures.

The preferred structure of the light deflecting means 110 for addressing a selecting information location of the storage unit is the structure disclosed in the patent application entitled "Light Beam Deflection System" filed June 5, 1963, Ser. No. 285,832 by Thomas J. Harris and Werner W. Kulcke and assigned to the same assignee as the present invention. FIG. 10 schematically illustrates this interrogating means. The reflected light of the chosen frequency $f_{10}$, for example, enters the means 110 in the form of light beams 140 or no-light beam pattern of the information storage locations of the optically accessible storage unit. The means 110 is composed of a row selecting means 142 and a single information storage area selecting means 146. The chosen light beam row 144 passes to the information storage area selecting means 146 which is positioned at right angles to the row selecting means 142. In the selecting means 146 a single area location is selected to be interrogated. A light beam 149 is found to be present therein and is passed to the photodetector 112 through focusing lens 145 and mask 147. The mask 147 blocks the random light from the light deflector 110 from affecting the photodetector 112. The photodetector provides an electrical signal to the register 114 when pulsed with a light beam such as 149. If a light beam had not been present in the interrogated storage area, there would be no output signal. The information selecting and light deflecting means 110 is controlled by information source 148 which in turn acts in response to the applied input signals. The operation of this light deflection device is described in detail in the above mentioned patent application.

A second embodiment for the read-out of the optically accessible memory system is shown in FIG. 11. A system for addressing with the light source one of a number of storage units electrically at high speeds is illustrated in conjunction with this second embodiment.

However, this storage unit addressing system is usable with all read-out embodiments described herein. While only a series of 12 storage units (SU) are schematically illustrated, the number is not critical and additional units can be added or fewer units used. A source of light 100 containing all frequencies recorded in the storage units is collimated in the collimating lens 102 and directed along a light path 150 by beam splitter 152. The beam splitter 152 is the illustrated means between the light source and storage unit in this embodiment for passing the light to the storage unit and for providing as a separate output the light reflected from the storage unit. The light path 150 has a series of light switching units 153 of the type previously described. Each of these light switching units 153 is associated with one optically accessible storage unit (SU). The light switching unit is preferably constructed identically to the switching means 108 described above. When a given storage unit is to be interrogated and information read out therefrom, its associated switching unit 153 is actuated and the light propagating along path 150 is directed to the associated storage unit. The reflected light passes from the selected storage unit through the associated light switching means 153 and back along the light path 150.

The reflected light passes through the beam splitter 152 and proceeds along light path 160 into the information read-out system of FIG. 11. The light passes through the series of light switching means 108. The reflected light is switched down the selected monochromatic light frequency path by operation of the appropriate electro-optic phase plate 124 with the switching means 108 as described in the FIG. 9 embodiment. All frequencies of light are filtered out by the light filter $F_1$, $F_2$, etc., or $F_{10}$ except the light of the selected frequency which passes by means of beam splitters 166 to word selector means 170 composed preferably of the first stage row selecting structure 142 of FIG. 10. A group of information storage locations in the optically accessible storage unit are simultaneously addressed as described above in relation to FIG. 10. The lens system which includes lens 169 and lens $L_1$, $L_2$, etc., and $L_{10}$, compensates for the dispersion of light due to the scattering effect of the medium of the storage unit. The light output from the word selector 170 is encased in the light tube 171. The dispersion compensating lens 169 is located within the tube 171. The light from word selector 170 passes through lens 169 and falls upon the input ends of optical fibers 172 at the light output of the tube 171. Optical fibers 172 connect the light output of the word selector means 170 to their respective light sensing means such as photodetectors 174. Each photodetector provides an electric signal to the output register 176 for each pulse of light applied to it. Information in the form of light or no-light is directed from independent storage locations through their respective optical fibers to the light sensing means and output register. The use of the series of beam splitters 166 and the multiple optical fiber output allows for a single light deflecting and selecting means of simpler construction.

FIG. 12 shows another embodiment of the read-out system of the optically accessible storage unit. A source 100 of light containing all frequencies recorded in the storage unit 10 is collimated in collimating lens 102. A tunable frequency or color filter 182 is located in the collimated light path. The selected monochromatic light frequency is the only light frequency to pass the tunable color filter 182. This selected frequency then passes through the means 104 and 106 for passing the light from the light source to the storage unit and for providing as a separate output the light reflected from the storage unit. The means 104 and quarterwave plate 106 operation has been described above in relation to its use in the FIG. 9 embodiment. The reflected light from the storage unit 10 passes back through the quarterwave plate 106 and is the output from means 104 to the information means 190 of the present embodiment for detecting presence of information at each storage location.

The information detecting means is the subject of U.S. Pat. No. 2,983,824 issued May 9, 1961 to R. W. Weeks and W. E. Dickinson and assigned to the same assignee as the present invention. Briefly the information detecting means 190 includes a cathode ray tube 192 having an offset electron gun 194 out of the light path 200 of the reflected light passing through the principal portion of the cathode ray tube. The reflected light passes along path 200 through the major portion of the cathode ray tube 192 and is applied through electro-optic crystal 196, transparent electrode 198 and applied to analyzer 199. The collimated plane polarized light passing along light path 200 will be completely absorbed by analyzer 199 in absence of a surface charge on the electro-optic crystal 196. A narrow output beam of light can be generated by depositing a surface charge on a portion of the electro-optic crystal 196. The surface charge is deposited by application of the electron beam to the desired spot. This deflection is accomplished by addressing a digital to analog conversion means 191 with appropriate horizontal and vertical address signals. The conversion means 191, in turn, causes the correct deflection voltages to be applied by the horizontal and vertical deflection voltage unit 193 to the deflection plates 195 of the cathode ray tube 192. The direction of the plane of polarization of the polarized light along path 200 is then rotated 90 degrees during its passage through the crystal 196 at the location where the surface charge was applied to the crystal 196. The rotated portion of the instant beam is transmitted through the analyzer 199 and appears as a narrow collimated light output beam where it is focused by lens 201 onto a photodetector 202. The photodetector 202 produces an electrical signal when information is detected.

The tunable filter 182 is a tunable narrow-band filter that has the ability to provide an output of one at a time of the several recorded frequencies in the optically accessible storage unit. One filter of this type that has proved effective is a polarization interference filter which can have a bandpass as small as a fraction of an Angstrom unit. The bandpass can be shifted to any desired region of the visible spectrum. The transmission band is formed by the superposition of the polarized channel spectra produced by x-cut plate of quartz or other birefringent media placed between parallel polarizers. The tuning is accomplished by changing the retardation of successive elements so that transmission maxima in various channel spectra coincide at the desired wave length. The retardation change can be made mechanically, for example, by stretching supplemental plastic sheets in series with the filter elements or can be made electrically by using Kerr cells or crystals with high electro-optic coefficients.

FIG. 13 shows a fourth read-out embodiment. A source of light 100 containing all frequencies recorded in the storage unit is focused and directed through the light deflector means 110 by lens 102. The output of the light deflector means 110 is a single beam of light from light source 100 and is directed by the light deflector means to the selected storage location in the storage unit 10 to be addressed. The light deflector means 110 is identical in structure to that described in relation to FIGS. 9 and 10. However, to accomplish the direction of a light beam to a particular storage location, the components of the light deflector means 110 of the earlier described embodiments are reversed so that the light passes first through the means 146 and then the means 142 of the light deflector 110. This light deflector structure is more fully described in the above mentioned patent application Ser. No. 285,832. The light passes through beam splitter 152 and is shown only upon the selected storage location in the storage unit 10. The illuminated storage location reflects light from its scattering layers which correspond to the stored light frequencies. This reflected light passes through beam splitter 152 which directs half of the light to lens 250. Lens 250 collects the reflected light which then passes through the series of beam splitters 252. A portion of the reflected light is again reflected by each of the beam splitters 252 through their respective associated light filters $F_1$, $F_2$, etc., and $F_{10}$. The light of each frequency stored in the storage unit location addressed is then passed by means of focusing lens 254 to the light sensing means 256 associated with each of the light filters. Where light pulses are applied to the light sensing means 256 electric signals are stored in parallel in the output register 258.

The following is an example that specifically illustrates in detail the preparation of a photosensitive medium, the recording of information in the photosensitive medium in eight anharmonic frequencies, to form an optically accessible storage unit, and the resultant read-out from the storage unit. The example is included to aid merely in the understanding of the invention and variations may obviously be made by one skilled in the art without departing from the spirit and scope of the invention.

EXAMPLE

A 2 by 2 inch glass plate was thoroughly washed, rinsed, and dried. The following solutions were made up in clean containers:

a.

gelatin - 1 gram
distilled water - 25 cc.

b.

gelatin - 2 grams
potassium bromide - 0.25 grams
distilled water - 50 cc.

c.

silver nitrate - 0.3 grams
distilled water - 5 cc.

The solutions (a) and (b) were heated on a hot plate until the gelatin in each was melted. The heat was removed and the solutions were allowed to cool to a temperature of approximately 40°C. The solution (c) was then added to the solution (a) and the mixture was slowly added to the solution (b) with stirring. The stirring was continuous and gentle. An 0.8 cc. of a 1/1000 alcoholic solution of pinacyanol chloride and 0.8 cc. of a 1/1000 alcoholic solution of erythrosine-bluish were added as sensitizers. The solution was then filtered. The filtered solution was then flowed on and off the clean, dry glass plate several times until about a 15 micron thickness was obtained. The coated plate was allowed to dry in a darkened, dust-free area with a slow circulation of air. After drying, the plates were washed in running water for approximately fifteen minutes and allowed to dry.

A single information storage location of the film was exposed by placing the photosensitive coated media into the exposure box and successively exposing the storage area with a mercury arc light source through eight different light filters. The storage unit was exposed one minute at a time to light of the following monochromatic frequencies: 5461, 5600, 5791, 5950, 6104, 6300, 6500 and 6708 Angstrom units.

The exposed photosensitive medium was removed from the light tight box and made ready for developing. The plate was placed in a stainless steel holder. The plate was then tank developed in two liters of fresh KODAK D-19 developer for 5 minutes in total darkness, at room temperature and with continuous agitation. The developing action was stopped with 2 liters of KODAK Indicator Stop Bath for thirty seconds in total darkness, at room temperature and with continuous agitation. The plate was then placed in 2 liters of KODAK Fixer for 10 minutes. The plate was tray washed with a siphon type washer for fifteen minutes with 68°F. water. The plate was bleached in mercuric chloride bleach at room temperature. The plate was then washed for 5 minutes. The plate was then immersed in KODAK Photo-Flo for 30 seconds at room temperature. The plate was then dried in a hanging position in a hood with circulating air for approximately 4 hours.

A six degree glass prism for protective purposes was carefully adhered to the film surface 22 of the storage unit 10 by the following procedure. A drop of canada balsam was applied to and spread over the surface of the prism to be adhered to the film 22. The balsam was heated at 100°C. until it was very tacky. The prism with the balsam side down was pressed firmly against the film 22. Air gaps were removed by pressing and sliding the prism back and forth over the film. Excess balsam was removed with alcohol.

The experimental read-out system used a small parallel beam of light obtained from a zirconium lamp. The light was collimated with a microscope objective. The exposed information storage area in the storage unit was placed in the beam of light, which contained the recorded frequencies, so that light entered the unit normally. The reflected light from the storage area was directed into a Bausch and Lomb monochrometer by a 45/45 beam splitter. The light output from the monochrometer was picked up by a photomultiplier tube. The resultant electrical signals from the photomultiplier were displayed on the $x$-axis of an $x$–$y$ recorder and are given as FIG. 14. The signal proportional to the monochrometer wave length is displayed on the $y$-axis.

The FIG. 14 shows, in addition to the light frequency read-out of the storage unit, the light frequencies used in exposing the photosensitive medium. A shift in frequency is observed between the exposed and the read-out frequencies. This slight shift to the higher wave length is caused by the swelling of the medium during the development of the metallic reflecting layers. The swelling is due to small portions of the developing solutions being absorbed by the photosensitive emulsion. The swelling increases the distance between the reflecting layers slightly and gives the observed shift to a slightly higher wave length.

There are several possible methods for read-out of information from the optically accessible storage unit 10. These methods are serial read-out in the depth dimension of a storage location, parallel read-out of a single frequency or color, serial read-out of a single frequency and parallel read-out in the depth dimension of a storage location. The read-out embodiment structures of FIGS. 9, 11, 12 and 13 are each particularly suited for performing one of these read-out methods.

Serial read-out in depth may be accomplished using the FIG. 9 embodiment. The light source 100 illuminates the optically accessible storage unit 10 with all the frequencies which may have been recorded therein. The reflected light from the scattering layers in the medium 22 is reflected by prism 104 to the series of light switching means 108. If the electro-optic phase plate 124 is actuated in a given light switching means 108, the plane of polarization of the incoming light is rotated by 90°, and is totally reflected at the crystal boundary and air gap 130. The lens 131 images the storage unit plane through the selected light filter to the input of the light information selecting means 110. All of the units 110 are operated in parallel. The light deflector 110 directs the incoming light so that only light from one storage location passes through the lens and aperture to light sensing means 112. If color $f_1$ is present in the selected cell, the light sensing means 112 yields an output which is recorded in the output register. In the next information read-out operation, the electro-optic phase plate 124 in the second light switching means 108 is operated. Since all the light deflectors 110 are operated in parallel, the same location is selected by the digital deflector 110. If color $f_2$ is present, the bit will be detected by sensing means 112 and another stage of the register will be set. This process continues on a serial basis until all the light switching means 108, one per color or frequency in the film, have been operated. Thus the bits stored in a cell (in depth) have been read out serially.

Parallel read-out of a single color is possible using FIG. 11 read-out embodiment. If the first light switching unit 153 is operated, the light is directed onto the storage unit SU1 and back through the beam splitter 152 to the series of light switching means 108. If the first switch SW1 is operated, the light is directed through filter $F_1$ and lens $L_1$ to beam splitter 166. The lens images the storage unit onto the input of the word selector means 170. The second lens at the output of the word selector images the information at the input to the word selector means 170 onto the ends of a bundle of optical fibers 172. If light is present in a given cell of the selected word, it will be detected by the photodetector 174 associated with that fiber, and set one stage of the output register. If light is present in other storage locations, the corresponding register stages will be set. Thus we have read out in parallel a word stored as one color or frequency in the storage unit.

Serial read-out of a single frequency can be conveniently accomplished with the FIG. 12 structure. Light of one frequency from tunable filter 182 illuminates the storage unit 10, and is projected as a separate output onto the electro-optic potassium dideuterium (KDP) crystal in the electro-optic tube after reflection through prism 104. The electron beam in cathode ray tube 192 is directed to a specific area of the electro-optic crystal whereat an electron charge is deposited by the beam. If light is present at that storage location, the light will pass analyzer 199 and be focused by lens 201 onto light sensing means 202. Thus we have read out a single storage location of a single color by merely deflecting the electron beam to the position of the storage location to be addressed on the electro-optic crystal. The detecting means 190 operates in this manner as a point shutter to serially scan and interrogate at high speeds the information present in the optically accessible storage unit. The means 190 passes serially the reflecting light, if present, from each information storage unit. Photodetectors 202 convert the light impulses into electrical pulses which are fed to an output register.

Parallel read-out in the depth dimension is possible using the FIG. 13 read-out embodiment. Converging light containing all relevant frequencies is directed by the light deflector means 110 to the particular storage location to be addressed. This illuminated storage location now acts as a new source of light, reflecting all stored light frequencies. Lens 250 collects this reflected light, which is subsequently reflected by the series of beam splitters 252 and passes through the associated light filters $F_1$, $F_2$, etc., and $F_{10}$. Lens 254 focuses the light emerging from the filters onto photodetectors 256. The detected signals are stored in parallel in the output register 258.

The term "light" has been used throughout the description of this invention. This term is used in its largest sense so as to include not only the visible portion of the electromagnetic spectrum but also the infrared and ultraviolet portions of the spectrum. It will be apparent to one skilled in the art that such a wide range of frequencies can be recorded into the photosensitive medium contemplated by the present invention and read out from the storage unit according to the techniques of the present invention.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An optically accessible information storage unit comprising:

a transparent medium;

said medium being distinguishable with each accessing into a plurality of discrete independently accessible information storage areas;

each of said areas including a plurality of light scattering layers formed in depth in the medium during the independent accessing and corresponding to the information stored within that information storage area.

2. An optically accessible information storage unit comprising:

a support plate;

a transparent medium on said plate;

said medium being divisible into individual information storage areas;

a plurality of light scattering layers in depth spaced at periodic intervals for each frequency of information stored within said individual information storage areas; and an encapsulating body having an appropriate index of refraction surrounding said medium.

3. An optically accessible information storage unit comprising:

a transparent medium;

said medium being distinguishable into separable information storage areas;

said medium having a thickness greater than 10 microns and a surface resolution greater than 1000 lines per millimeter; and a plurality of partially scattering layers in depth spaced at periodic intervals for each frequency of information stored within said information storage areas.

4. An optically accessible information storage unit comprising:

a supporting means;

a transparent film on said supporting means;

said film being divisible into individual information storage areas being in size less than 50 microns in the largest dimension;

said film having a thickness greater than 10 microns and a surface resolution greater than 1000 lines per millimeter;

a plurality of partially reflecting metal layers in depth spaced at half wavelength intervals for each frequency of information stored within said individual information storage areas;

the maximum number of frequencies capable of being stored in each said information storage area exceeds five; and an encapsulating body having an appropriate index of refraction surrounding said film.

5. A system for recording information into a three-dimensional optically memory unit having a plurality of information storage areas concurrently available with each accessing to produce within said unit a plurality of light scattering layers in depth in selected information storage areas comprising:

means for selectively applying a first light wave to at least one of the given information storage areas of the plurality of such areas available in said memory unit with each accessing in accordance with the information to be recorded therein; and means providing a second light wave for causing the establishment of interference patterns as plural light scattering layers in depth in the said given information areas by interference with the first light wave.

6. A system for recording information into a three-dimensional optically accessible storage unit having a plurality of information storage areas concurrently available with each accessing to produce within said unit a plurality of light scattering layers in depth spaced at periodic intervals for each frequency in selected information storage areas comprising:

a reflecting surface positioned behind said storage unit; and means for selectively applying various light frequencies to at least one of the given information storage areas of the plurality of such areas available in said storage unit with each accessing in accordance with the information to be recorded to establish standing waves in the given storage areas for each light frequency applied by causing interference between the applied light frequencies and the light frequencies reflected from said surface.

7. A system for recording information into a three-dimensional optically accessible storage unit to produce a medium within said unit containing a plurality of light scattering layers in depth spaced at periodic intervals for each frequency in designated information storage areas comprising:

a light source for providing a high intensity, collimated, substantially monochromatic light beam;

an information mask associated with said monochromatic light beam for establishing individual information areas in the said light beam and for containing information in the established information areas in the form of open and closed light paths whereby the monochromatic light beam which leaves the mask has in cross-section a no-light, grid-like portion which separates the information areas of light and no-light corresponding to the open and closed paths in the associated information mask; and means for establishing interference patterns within the information areas of said storage unit using the said monochromatic light beam containing information in the form of light and no-light areas from said information mask whereby said scattering layers are formed at the antinodes of said interference pattern.

8. A system for recording information into a three-dimensional optically accessible storage unit comprising:

a light source for providing a high intensity, collimated, substantially monochromatic light beam;

a reflecting surface on the side of said storage unit opposite to the said light source;

an information mask associated with said monochromatic light beam for establishing individual information areas in the said light beam and for containing information in the established information areas in the form of open and closed light paths whereby the monochromatic light beam which leaves the mask has in cross-section a no-light, grid-like portion which separates the information areas of light and no-light corresponding to the open and closed paths in the associated information mask; and means for applying the said monochromatic light beam containing information in the form of light and no-light areas to the face of said storage unit whereby the light information areas of said light beam pass through said storage unit, are reflected from said reflecting surface and return through said storage unit to thereby set up a standing wave pattern along their paths through the information areas of the storage unit which causes a modification of the light sensitive component of the said storage unit at the antinodes of the said standing wave pattern.

9. A system for recording information into a three-dimensional optically accessible storage unit comprising:

means for providing a plurality of high intensity, collimated, substantially monochromatic light beams of different frequencies;

an information mask associated with each monochromatic light beam for establishing individual information areas in the said light beam and for containing information in the established information areas in the form of open and closed light paths whereby the monochromatic light beam which leaves the mask has in cross-section a no-light grid-like portion which separates the information areas of light and no-light corresponding to the open and closed paths in the associated information mask;

a reflecting surface on the side of said storage unit opposite to said beam providing means; and means for superimposing the said information containing plurality of monochromatic light beams and simultaneously applying the superimposed beam to said storage unit to cause independent standing wave patterns to be developed in each said information area for each monochromatic frequency present in that area whereby a substantial modification of the light sensitive component of the said storage unit is effected at the antinodes of each standing wave pattern.

10. A system for recording information into a three-dimensional optically accessible storage unit to produce a medium within said unit containing a plurality of light scattering layers in depth spaced at periodic intervals for each frequency in designated information storage areas comprising:

means for providing a high intensity, collimated, substantially monochromatic light beam;

a body of electro-optically active crystalline material;

a polarizer for polarizing light mounted between said body and the said beam providing means so that the light from said providing means propagates through said polarizer and through said body;

an analyzer mounted on the side of said body opposite to said beam providing means;

a plurality of pairs of electrodes associated with a regular pattern of active portions of said body;

said active portions being responsive to voltages applied by said associated pairs of electrodes to reverse the orientation of that portion effected in the form of a strain-induced birefringence whereby the angle of polarization of light passing therethrough is effectively changed which, in turn, changes the light transmission through the combination of said polarizer, active portions of said body and analyzer;

and means for establishing interference patterns within the information areas of said storage unit using the said monochromatic light beam containing information in the form of light and no-light areas from said information mask whereby said scattering layers are formed at the antinodes of said interference pattern.

11. A system for recording information into a three-dimensional optically accessible storage unit comprising:

means for providing a plurality of high intensity, collimated, substantially monochromatic light beams of different frequencies;

a body of ferroelectric crystalline material;

a polarizer for polarizing light mounted between said body and the said beam providing means so that the light from said providing means propagates through said polarizer and through said body;

an analyzer mounted on the side of said body opposite to said beam providing means;

a plurality of pairs of electrodes associated with a regular pattern of active portions of said body;

said active portions being responsive to voltages applied by said associated pairs of electrodes to reverse the orientation of that portion effected in the form of a strain-induced birefringence whereby the angle of polarization of light passing therethrough is effectively changed which in turn changes the light transmission through the combination of said polarizer, active portions of said body and analyzer;

a reflecting surface on the side of said storage unit opposite to said beam providing means;

means for superimposing the said information containing plurality of monochromatic light beams and simultaneously applying the superimposed beam to said storage unit to cause independent standing wave patterns to be developed in each said information area for each monochromatic frequency present in that area whereby a substantial reduction of the light sensitive component of said storage unit is effected at the antinodes of each standing wave pattern and upon developing and fixing the said reduced portions, permanent metallic light reflective layers are produced at said antinodes.

12. A system for reading information from an optical storage unit containing information in a plurality of storage locations in the form of a plurality of light scattering layers spaced in depth comprising:

a source of light containing light from all the information components recorded in said storage unit;

means between said light source and storage unit for passing the light from said light source to said storage unit and for providing as a separate output the light scattered by said layers from said storage unit;

means for separating said scattered light into its information components; and means for detecting the presence of information in each component of said scattered light at each storage location and providing an indication when said information is present.

13. A system for reading information from an optically accessible storage unit containing information in the form of a plurality of storage locations having a plurality of light scattering layers spaced in depth at periodic intervals comprising:

a source of light containing all frequencies recorded in said storage unit;

a first and second birefringent crystal having an air gap between them and a quarterwave plate, in the order named, between said light source and storage unit;

said crystals being so oriented in respect to one another that the incoming light from said light source is plain polarized in the first crystal and passes through said second crystal uneffected;

said quarterwave plate causes the portion of said polarized light that is scattered off said scattering layers and scattered through said quarterwave plate to be plain polarized at 90° to the direction of the said polarized light which first entered said quarterwave plate;

said plain polarized scattered light is refracted at the air gap and said first crystal boundary out of the path of the incoming said polarized light;

means for separating said scattered light into its component frequencies;
means for detecting the presence of information in each component frequency of said scattered light at each storage location and providing an electrical signal when said information is present.

14. A system for reading information from one of a number of optically accessible storage units containing information in the form of a plurality of storage locations having a plurality of light scattering layers spaced in depth at periodic intervals comprising:
a source of light containing all frequencies recorded in said storage units;
means for selectively addressing one storage unit of said plurality of storage units at a time;
means between said light source and selected storage unit for passing the light from said light source to said selected storage unit through said means for addressing and for providing as a separate output the light scattered from said selected storage unit;
means for separating said scattered light into its component frequencies; and
means for detecting the presence of information in each component frequency of said scattered light at each storage location and providing an electrical signal when said information is present.

15. A system for reading information from one of a number of optically accessible storage units containing information in the form of a plurality of storage locations having a plurality of light scattering layers spaced in depth at periodic intervals comprising:
a source of light containing all frequencies recorded in said storage units;
means for selectively addressing one storage unit of said plurality of storage units at a time which includes a series of light switching means in the path of the incoming light from said light source; each of said switching means being associated with one of said storage units, and means for individually activating said switching means to direct the said incoming light out of its normal light path to a path directly incident to the face of an associated said storage unit and to direct the resultant light scattered from said scattering layers in said storage unit back through said switching means into the said light path of said incoming beam;
means between said light source and selected storage unit for passing the light from said light source to said selected storage unit through said means for addressing and for providing as a separate output the light scattered from said selected storage unit;
means for separating said scattered light into its component frequencies; and
means for detecting the presence of information in each component frequency of said scattered light at each storage location and providing an electrical signal when said information is present.

16. A system for reading information from an optically accessible storage unit containing information in the form of a plurality of information storage areas having a plurality of light scattering layers spaced in depth at periodic intervals comprising:
a source of light containing all frequencies recorded in said storage unit;
means between said light source and storage unit for passing the light from said light source to said storage unit and for providing as a separate output the light reflected from said storage unit;
a light filter means for each component frequency capable of passing only the reflected light from the designated component frequency;
means responsive to an electrical signal for directing said reflected light through one of said filter means;
an output register;
a photodetector for providing an electrical signal to said register for each pulse of light applied to it; and
means for accepting the output light from said light filter means and passing the reflected light from a selected said information storage area to said photodetector.

17. A system for reading information from an optically accessible storage unit containing information in the form of a plurality of storage locations having a plurality of light scattering layers spaced in depth at periodic intervals comprising:
a source of light containing all frequencies recorded in said storage unit;
means between said light source and storage unit for passing the light from said light source to said storage unit and for providing as a separate output the light reflected from said storage unit;
a series of light switching means in the path of said reflected light;
a light filter means associated with each said light switching means;
each said filter means corresponding to a recorded frequency in said storage unit and being capable of only passing its respective recorded frequency;
means for individually activating said switching means to direct the said reflected light out of its normal light path through said associated light filter means;
an output register;
light sensing means for providing an electrical signal to said register for each pulse of light applied to it; and
means for addressing said storage locations in said storage unit by selectively passing said reflected light of a single frequency obtained as the output from said filter means to said light sensing means.

18. A system for reading information from an optically accessible storage unit containing information in the form of a plurality of information storage areas having metallic reflective layers spaced in depth at half wavelength intervals comprising:
a source of light containing all frequencies recorded in said storage unit;
a first and second birefringent crystal having an air gap between them and a quarterwave plate, in the order named, between said light source and storage unit;
said crystals being so oriented in respect to one another that the incoming light from said light source is plain polarized in the first crystal and passes through the second crystal uneffected;
said quarterwave plate causes the portion of said polarized light that is reflected off said reflective layers and reflected back through said quarterwave plate to be plain polarized at 90° to the direction of the said polarized light which first entered said quarterwave plate;

said plain polarized reflected light is refracted at the air gap and said first crystal boundary out of the path of the incoming said polarized light;

a light filter means for each component frequency capable of passing only the reflected light from the designated component frequency;

switching means associated with each said filter on the filter's input side for directing said reflected light through its associated said filter means at the response of an electrical signal;

where no signal is applied to a switching means the said reflected light passes directly to the next switching means;

means for serially providing electrical signals to each of said switching means to address each information area serially in depth for the presence of the recorded frequencies; and a light deflector means in the path of the light output of each said filter means for selecting an information storage area to be addressed.

19. A system for reading information from an optically accessible storage unit containing information in the form of a plurality of storage locations having a plurality of light scattering layers spaced in depth at periodic intervals comprising:

a source of light containing all frequencies recorded in said storage unit;

means between said light source and storage unit for passing the light from said light source to said storage unit and for providing as a separate output the light reflected from said storage unit;

a series of light switching means in the path of said reflected light;

a light filter means associated with each said light switching means;

each said filter means corresponding to a recorded frequency in said storage unit and being capable of only passing its respective recorded frequency;

means for individually activating said switching means to direct the said reflected light out of its normal light path through said associated light filter means;

an output register;

light sensing means corresponding in number to the number of storage locations addressed at one time for simultaneously, with the other light sensing means, providing an electrical signal to said register for each pulse of light applied to them; and a word selector means for addressing a plurality of said storage locations in said storage unit at one time by selectively passing said reflected light of a single frequency obtained as an output from said filter means to said number of light sensing means, whereby a number of storage locations are in parallel read-out in a single frequency.

20. A system for reading information from one of a number of optically accessible storage units containing information in the form of a plurality of storage locations having a plurality of light scattering layers spaced in depth at periodic intervals comprising:

a source of light containing all frequencies recorded in said storage units;

means for selectively addressing one storage unit of said plurality of storage units at a time which includes a series of light switching means in the path of the incoming light from said light source; each of said switching means being associated with one of said storage units; and means for individually activating said switching means to direct the said incoming light out of its normal light path to a path directly incident to the face of an associated said storage unit and to direct the resultant light reflected from said scattering layers in said storage unit back through said switching means into the said light path of said incoming beam;

means between said light source and selected storage unit for passing the light from said light source to said selected storage unit through said means for addressing and for providing as a separate output the light reflected from said selected storage unit;

a light filter means for each component frequency capable of passing only the reflected light from the designated component frequency;

an output register; a light sensing means for providing an electrical signal to said register for each pulse of light applied to it; and a light deflector means for addressing an information storage location in said storage unit by selectively passing said reflected light of a single frequency obtained as an output from said filter means to said light sensing means.

21. A system for reading information from an optically accessible storage unit containing information in the form of a plurality of storage locations having a plurality of light scattering layers spaced in depth at periodic intervals comprising:

a source of light containing all frequencies recorded in said storage unit;

means between said light source and storage unit for passing the light from said light source to said storage unit and for providing as a separate output the light scattered from said storage unit;

means for selectively applying the light from said light source to said storage locations;

means for separating said scattered light into its component frequencies; and means for detecting the presence of information in each component frequency of said scattered light at each storage location and providing an electrical signal when said information is present.

22. A system for reading information from an optically accessible storage unit containing information in the form of a plurality of storage locations having a plurality of light scattering layers spaced in depth at periodic intervals comprising:

a source of light containing all frequencies recorded in said storage unit;

means between said light source and storage unit for passing the light from said light source to said storage unit and for providing as a separate output the light reflected from said storage unit;

means for selectively applying the light from said light source to said storage locations;

a light filter means for each component capable of passing only the light reflected from the designated component frequency;

means for simultaneously passing a portion of said reflected light from said storage unit to each of said light filter means;

an output register; and a light sensing means in the path of the output light from each said light filter means for providing an electrical signal to said register for each pulse of light applied to them, whereby the reflected light frequencies from an individual storage location are in parallel read-out of said storage unit.

23. A system for addressing with a light beam one of a plurality of optically accessible storage units wherein each unit contains a plurality of information storage areas having a plurality of light scattering layers spaced in depth at periodic intervals comprising:

a series of light switching means in the path of the incoming said light beam;

each of said switching means being associated with one of said storage units; and means for individually activating said switching means to direct the said incoming light beam out of its normal light path to a path directly incident to the face of an associated said storage unit and to direct the resultant light scattered from said scattering layers in said storage unit back through said switching means into the said light path of said incoming beam.

24. A system for reading information from an optically accessible storage unit containing information in the form of a plurality of storage locations having a plurality of light scattering layers spaced in depth at periodic intervals comprising:

a source of light containing all frequencies recorded in said storage unit;

means between said light source and storage unit for passing the light from said light source to said storage unit;

means for providing as a separate output the light scattered from said storage unit; and means for detecting the presence of information in each recorded frequency of said scattered light.

25. A system for reading information from an optically accessible storage unit containing information in the form of a plurality of storage locations having a plurality of light scattering layers spaced in depth at periodic intervals comprising:

a source of light containing all frequencies recorded in said storage unit;

means for selectively passing a single frequency from said source to said storage unit;

means for providing as an output the light scattered from said storage unit; and means for detecting the presence of information in the scattered light at each storage location.

26. In a system for recording information, a storage medium distinguishable with each accessing into a plurality of discrete independently accessible storage areas;

means for selectively supplying to at least one of the areas of the storage medium a first light beam in accordance with the information to be stored; and means providing a second beam for causing the establishment of interference patterns spaced in depth as plural light scattering layers in depth within said selected information storage areas by interference with the first light beam.

27. In a system for reading information, a storage medium distinguishable into discrete storage areas and having interference patterns spaced in depth as light scattering layers in accordance with the information components recorded within certain of the discrete information storage areas;

means for passing to the storage medium a source of light containing light from all recorded information components;

means for providing as an output the light scattered from the plurality of layers in the given storage areas; and means responsive to the scattered light output for detecting the information components present in each storage area from the scattered light.

28. In an information storage system having a three-dimensional optical memory unit for storing information in selected ones of a plurality of information storage areas available with each accessing of the unit, comprising:

means for selectively applying a first light wave to at least one of the given information storage areas of the plurality of such areas available in the memory unit with each accessing in accordance with the information to be recorded therein;

means providing a second light wave for causing the establishment of interference patterns in the given information areas to record information as a plurality of light scattering layers spaced in depth by interference with the first light wave;

accessing means for passing to at least one area of the memory unit light from a source containing all recorded information components after processing of the memory unit;

means for providing as an output the light scattered from the plurality of layers in the accessed ones of the given information storage areas of the processed memory unit; and means responsive to the scattered light output for detecting the information present in the accessed areas from the scattered light.

29. The optically accessible information storage unit of claim 4 wherein said supporting means is opaque and reflective.

30. A system for reading information from an optically accessible storage unit containing information in the form of a plurality of storage locations having a plurality of light scattering layers spaced in depth at periodic intervals comprising:

a source of light containing all frequencies recorded in said storage unit;

means between said light source and storage unit for passing the light from said light source to said storage unit and for providing as a separate output the light reflected from said storage unit;

a series of light switching means in the path of said reflected light;

a light filter means associated with each said light switching means;

each said filter means corresponding to a recorded frequency in said storage unit and being capable of only passing its respective recorded frequency;

means for individually activating said switching means to direct the said reflected light out of its normal light path through said associated light filter means;

an output register;

a light sensing means in the output light path of each said light filter means for providing an electrical signal to said register for each pulse of light applied to it;

a light deflector means between each said filter means and its said associated light sensing means for addressing an information storage location in said storage unit by selectively passing said reflected light of a single frequency obtained as an output from its said filter means to said light sensing means; and said light deflector means being controlled in parallel so that only one said information storage location at a time is addressed.

31. A system for reading information from an optically accessible storage unit containing information in the form of a plurality of storage locations having a plurality of light scattering layers spaced in depth at periodic intervals comprising:

a source of light containing all frequencies recorded in said storage unit;

a first and second birefringent crystal having an air gap between then and a quarterwave plate, in the order named, between said light source and storage unit;

said crystals being so oriented in respect to one another that the incoming light from said light source is plain polarized in the first crystal and passes through the second crystal uneffected;

said quarterwave plate causes the portion of said polarized light that is reflected off said scattering layers and reflected back through said quarterwave plate to be plain polarized at 90° to the direction of the said polarized light which first entered said quarterwave plate;

said plain polarized reflected light is refracted at the air gap and said first crystal boundary out of the path of the incoming said polarized light.

32. A system for reading information from an optically accessible storage unit containing information in the form of a plurality of information storage areas having a plurality of light scattering layers spaced in depth at periodic intervals comprising:

a source of light containing all frequencies recorded in said storage unit;

means between said light source and storage unit for passing the light from said light source to said storage unit and for providing as a separate output the light scattered from said storage unit;

a light filter means for each component frequency capable of passing only the scattered light from the designated component frequency;

an output register;

a light sensing means for providing an electrical signal to said register for each pulse of light applied to it; and a light deflector means for addressing an information storage location in said storage unit by selectively passing said scattered light of a single frequency obtained as an output from said filter means to said light sensing means.

33. A system for reading information from an optically accessible storage unit containing information in the form of a plurality of storage locations having a plurality of light scattering layers spaced in depth at periodic intervals comprising:

a source of light containing all frequencies recorded in said storage unit;

a light deflector means positioned in the path of light from said light source for selectively passing light from said light source to be applied to individual said storage locations;

a first and second birefringent crystal having an air gap between them and a quarterwave plate, in the order named, between said light deflector means and storage unit;

said crystals being so oriented in respect to one another that the incoming light from said light source is plain polarized in the first crystal and passes through the second crystal uneffected;

said quarterwave plate causes the portion of said polarized light that is reflected off said scattering layers and reflected back through said quarterwave plate to be plain polarized at 90° to the direction of the said polarized light which first entered said quarterwave plate;

said plain polarized reflected light is refracted at the air gap and said first crystal boundary out of the path of the incoming said polarized light;

a light filter means for each component capable of passing only the light reflected from the designated component frequency;

means for simultaneously passing a portion of said reflected light from said storage unit to each of said light filter means;

a light sensing means in the path of the output light from each said light filter means for providing an electrical signal to said register for each pulse of light applied to them, whereby the reflected light frequencies from an individual storage location are in parallel read-out of said storage unit.

34. Documentary storage photographic means comprising:

optical objective means defiing defining object field for a plurality of views and a record field for a plurality of representations;

optical separation means for optical association with said optical objective means providing changeable optical code means characterized by a plurality of optically operable differences;

photographic means substantially operatively stationary in said record field for the storage in a single photographic frame of a plurality of coextensive representations of a plurality of subjects;

said subjects being characterized by discrete symbols against contrasting background, the symbols of one of said subjects being unregistrable with the symbols of others of said subjects, said symbols being of substantially uniform optical character and said background being of substantially uniform optical character; and control means effective for selection of certain of said changeable optical code means in order to communicate selected coextensive representations in said frame with said object field and to obscure others of said coextensive representations in said frame from said object field.

35. The documentary storage photographic means of claim 34 wherein said objective means is a camera lens and said photographic frame is photosensitive.

36. The documentary storage photographic means of claim 34 wherein said objective means is a projection lens and said photographic frame is developed.

37. The documentary storage photographic means of claim 34 wherein said optical code means includes optical filter means.

38. The documentary storage photographic means of claim 34 wherein said optical code means includes optical interference means.

39. The documentary storage photographic means of claim 34 wherein said optical code means includes variable optical aperture means.

40. The documentary storage photographic means of claim 34 wherein said optical code means includes interference filter means.

41. Documentary storage photographic means comprising:

optical objective means defining an object field for plural views and a record field for plural representations;

optical separation means for optical association with said optical objective means providing plural optical code means characterized by plural optically operable differences;

photographic storage means having plural photographic frames;

first control means effective at any given time for the association of certain of said frames with said optical objective means and said optical separation means;

each of said frames being constituted for storing plural coextensive representations of plural subjects; said subjects being characterized by discrete symbols against contrasting background, the symbols of one of said subjects being unregistrable with the symbols of others of said subjects; and second control means effective at any given time for selection of certain of said plural optical code means in order to communicate one of said coextensive representations with said object field and to obscure others of said coextensive representations from said object field.

42. The documentary storage photographic means of claim 41 wherein said objective means is a camera lens and said photographic frame is photosensitive.

43. The documentary storage photographic means of claim 41 wherein said objective means is a projection lens and said photographic frame is developed.

44. The documentary storage photographic means of claim 41 wherein said optical code means includes optical interference means.

45. The documentary storage photographic means of claim 41 wherein said optical code means includes filter means.

46. A storage and retrieval process for a plurality of different field representations characterized by discrete symbols against contrasting background, said symbols being of substantially uniform optical character and said background being of substantially uniform optical character, the symbols of one of said representations characteristically being unregistrable with the symbols of others of said representations, said process comprising the steps of exposing a single photosensitive frame while stationary to said plurality of representations in terms of a plurality of different radiation fields having a plurality of optical differences thereamong and producing thereby said plurality of different representations in said single frame, said different representations being substantially coextensive with each other substantially throughout said frame, and communicating selected ones of said plurality of different radiation fields with said frame while stationary in order thereby to present selected optical images of individual said representations.

47. The storage and retrieval process of claim 46 wherein said photosensitive storage contains a photosensitive composition selected from the class consisting of silver halide material, diazo material, bichromated material, phototropic material and electroscopic material.

* * * * *